United States Patent Office 2,853,969
Patented Sept. 30, 1958

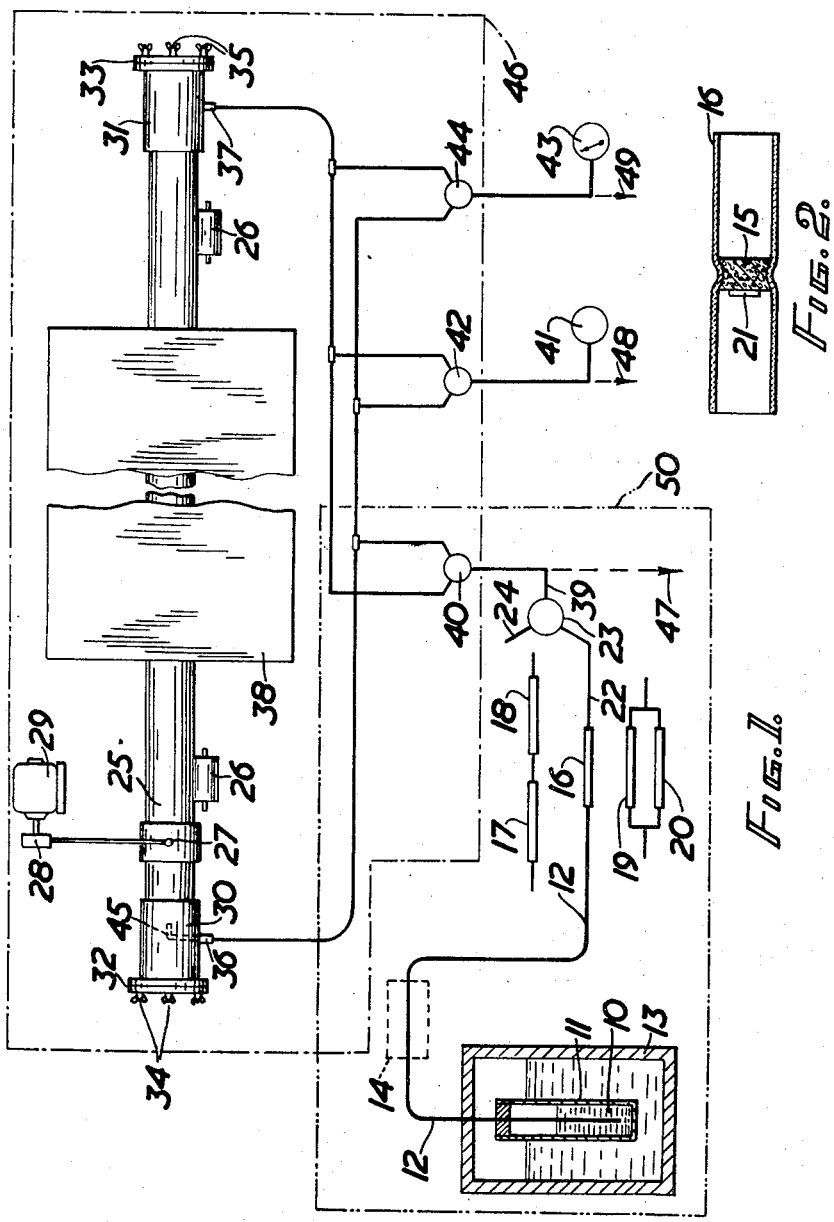

2,853,969
APPARATUS FOR PRODUCING ELECTRIC RESISTORS

Arthur Francis Drewett, London, England, assignor to Erie Resistor Limited, London, England Application June 8, 1954, Serial No. 435,331

Claims priority, application Great Britain June 10, 1953

2 Claims. (Cl. 118—48)

This invention relates to apparatus for producing electric resistors of the type comprising a supporting body of insulating material upon which is deposited a layer of resistance material, the resistance material being produced by heating a suitable gas or vapour. In this apparatus as at present practised, the resistance material is carbon obtained by heating a hydrocarbon in gaseous form, but as will appear hereinafter other substances can be used. However, it is convenient to refer to the resistance material as the carbon layer and the invention will be described principally in relation to the production of a carbon deposit, but it can be applied also to the deposit of other materials.

In manufacturing resistors of this type, the gas is supplied at a constant predetermined rate to a heated chamber in which the bodies to be coated are placed. The rate of flow of the gas must be accurately controlled, since only then is it possible to obtain a body coated with a required deposit of carbon, and therefore having a required resistance. The flow rate of the vapour is too low for it to be controlled by normal flow control valves and the like.

In accordance with the present invention, in a process of the type described, the flow of the gas from which the deposit is obtained is controlled by means of a porous diaphragm or plug. Preferably this diaphragm or plug is composed of sintered glass. The use of a diaphragm of this kind has substantial advantages. Such a diaphragm is uniform in its flow characteristics over a period of time; when made of glass it is chemically inert with the materials normally used and in particular the flow characteristic of a given plug can be very easily modified to a desired value.

Other features and advantages of the invention will be apparent from the following description of one embodiment thereof, given by way of example, in conjunction with the accompanying drawing, in which Figure 1 is a diagram showing the apparatus for carrying the invention into effect, and Figure 2 is a longitudinal sectional view of flow control element.

The apparatus of Figure 1 is suitable for the production of electric resistors composed of a carbon layer, with or without additional substances, deposited upon rods of insulating material. Such resistors are usually referred to as "cracked carbon" resistors, and are used because of their high stability.

The hydrocarbon used to produce the carbon can be chosen from a wide variety, but I prefer to use heptane, benzene or methane. The hydrocarbon 10 is in a container 11, tightly sealed, from which it can be drawn off through a pipe 12. It is preferable and, depending upon the nature of the hydrocarbon, may be necessary to control the temperature of the hydrocarbon by means of a water or like jacket 13, which may be thermostatically controlled. Additionally or alternatively, the heating of the hydrocarbon to produce vapourisation can be effected in a suitable chamber at 14.

From the chamber 14, if used, the vapour in pipe 12 passes to a flow control element, which is shown in more detail in Figure 2. This element comprises a disc or plug 15, which is of a porous or diffusing nature; a suitable plug is made of sintered glass particles, of a type commercially available. In this case, it is possible to fuse the disc to the walls of a glass tube 16. The sintered glass plugs are identified by their porosity factors; for the purpose of the present invention discs in the range of 15, 30 or 40 microns are suitable.

Despite the ratings of these discs, they are not in practice sufficiently predictable in performance to enable them to be used without being calibrated. In most cases, the flow rate of a disc as fused into the tube 16 will not be the desired value but there are several ways in which the rate can be varied. For example, if the rate is too high, two discs can be used in series, as indicated at 17, 18 in Figure 1; if the rate is too low, two discs can be used in parallel as at 19, 20. Again, series-parallel combinations of discs can be used. Again, if the rate of a single disc is too high it is possible to reduce the rate by effectively obliterating part of the surface as at 21 in Figure 2. Resin, dental cement, wax, sealing wax or paint can be used for this purpose; it is necessary only that the material used should be unaffected by the hydrocarbons used. In this way, by a calibration process, the flow rate of a given disc can be ascertained, and can be altered (though only to effect a reduction of flow rate). Moreover, the flow rates are very constant over a period of time, so that the discs can be calibrated, for given operating conditions in the rest of the apparatus, in terms of electrical resistance produced for a given deposition time. This is clearly very desirable in practice.

The pipe 22 from the control element 16 passes to a cock 23, which at 24 admits to the atmosphere if desired.

The decomposition of the hydrocarbon takes place in a furnace shown in Figure 1. This furnace takes the form of a long tube 25 of refractory material, mounted upon spaced rollers 26 so that the tube is capable of at least a limited degree of oscillation about its longitudinal axis. It can be thus rocked by a lever 27 on the tube coupled to a cam 28 driven by a motor 29. Metal sleeves 30, 31 are secured to the ends of the tube, and these sleeves can be closed at their ends by removable sealing plates 32, 33, held by nuts 34, 35. Connection pipes 36, 37, communicating with the interior of the tube, are fitted in the sleeves. An electric furnace 38 surrounds the central portion of the tube.

The hydrocarbon vapour can be fed either to the pipe 36 or pipe 37, and with this objects pipe 39 from the outlet of cock 23 is connected to a two-way valve and cock 40, the two output openings of which are connected respectively to the pipes 36, 37. Likewise, a vacuum pump 41 is provided and can be connected by a two-way valve and cock 42 to pipes 36 or 37, and a vacuum gauge 43 can be connected to the same pipes by two-way valve and cock 44.

In practice, one of the end sealing plates is removed and a number of rods of refractory material, usually ceramic, are inserted into the central part of the furnace tube 25. The vacuum pump is connected to, say, a pipe 37 at one end of the tube, and the tube is continuously exhausted. Valve 40 is set to connect pipe 39 to pipe 36 at the other end of tube 25. The furnace 38 is switched on, and the tube rocking motor 29 is started when the working temperature of about 1000° C. is attained, and then the hydrocarbon and/or other gases are admitted by cock 23. The coating time is variable, for example from 10 to 120 minutes, depending on the gas used and the thickness of deposit required. In order to produce a batch of coated rods which are as uniform as possible in the thickness of deposit, the direction of flow of hydrocarbon vapour through tube 25 can be reversed from time to time by manipulation of the valves 40 and 42. In order further to improve the uniformity of deposit the hydrocarbon can be introduced into the middle of tube 25, as indicated diagrammatically at 45.

At any time, gauge 43 can be connected to the input or output of tube 25. This is useful in testing the apparatus for vacuum leaks.

It is usually convenient, in producing large numbers of resistor elements, to have two or more furnace tubes such as 25 simultaneously operating. In this case it is not necessary to duplicate all the apparatus shown in Figure 1, and a second furnace can be operated from the same by duplicating only that apparatus within the chain line 46. The connections to the valves corresponding to valves 40, 42, 44 are then made at 47, 48, 49 respectively.

It is sometimes necessary or desirable to use a mixture of vapours to produce the deposit upon the tube; for example, a proportion of boron may be used, in which case boron trichloride is sutiable as the source of boron. In this case it is necessary to duplicate that part of the apparatus shown within the chain line 50, using temperatures and flow control elements appropriate to the material. If more than one material is used for producing the deposit, it may be preferable to provide a separate pipe, such as 36 or 37 for admitting each material to the furnace.

At the end of the heating period, the coated rods are withdrawn, graded, spiralled if necessary, capped and coated in any suitable manner.

I claim:

1. An apparatus for the production of a thin deposit upon an insulating support by decomposition of a gaseous material at low pressure, said apparatus comprising a container for a liquid vapourisable hydrocarbon, means for inducing vapourisation of said hydrocarbon to produce said gaseous material, a calibrated porous element of sintered glass for accurately controllling the rate of flow of said gaseous material, an enclosure for a plurality of refractory supporting bodies, means for supplying to said enclosure the gaseous material from said porous element at its accurately controlled rate, means for heating said bodies within said container to a temperature sufficient to cause decomposition of said gaseous material, and means for maintaining said container at low pressure.

2. An apparatus in accordance with claim 1, including a container for at least one further liquid vapourisable material, means for inducing vapourisation of said further material to produce a further gaseous material and a second calibrated porous element of sintered glass for accurately controlling the rate of flow of said further gaseous material, and means for supplying to said enclosure said further gaseous material at its controlled rate.

References Cited in the file of this patent

UNITED STATES PATENTS

| | | |
|---|---|---|
| 1,893,286 | Iredell | Jan. 3, 1933 |
| 2,057,431 | Hobrock | Oct. 13, 1936 |
| 2,147,450 | Liebmann | Feb. 14, 1939 |
| 2,200,521 | Siegel | May 14, 1940 |
| 2,369,561 | Grisdale | Feb. 13, 1945 |
| 2,671,735 | Grisdale et al. | Mar. 9, 1954 |